United States Patent [19]

Dirlikov et al.

[11] 4,443,563

[45] Apr. 17, 1984

[54] POLYURETHANES BASED ON 1;4-3:6 DIANHYDROHEXITOLS

[75] Inventors: Stoil K. Dirlikov; Connie J. Schneider, both of Midland, Mich.

[73] Assignee: The Dow Chemical Company, Midland, Mich.

[21] Appl. No.: 502,400

[22] Filed: Jun. 8, 1983

[51] Int. Cl.³ .............................................. C08G 18/14
[52] U.S. Cl. .................................... 521/174; 521/176; 528/73
[58] Field of Search ....................... 521/174, 175, 176; 528/73

[56] References Cited

U.S. PATENT DOCUMENTS 3,626,023  12/1971  Brizgys ............................. 252/188.3

OTHER PUBLICATIONS

Montgomery et al., J. Am. Chem. Soc., 1946, pp. 390–393.

Primary Examiner—Maurice J. Welsh

[57] ABSTRACT

Polyurethane-type products are prepared by reacting a rigid diol such as a 1:4–3:6 dianhydrohexitol, such as isosorbide, with a polyisocyanate and, optionally, a polyahl. The high molecular weight polymers are easily prepared from renewable resources and exhibit good physical properties. The resulting polymer is suitably employed in the production of films, coatings, molded articles and foams.

11 Claims, No Drawings

POLYURETHANES BASED ON 1;4-3:6 DIANHYDROHEXITOLS

BACKGROUND OF THE INVENTION

This invention relates to polyurethanes and to a process for their preparation.

Polyurethanes constitute a broad class of polymeric materials having a wide range of physical characteristics. The polymers are produced by the reaction of a polyisocyanate with a polyfunctional compound having an active hydrogen in its structure. This active hydrogen compound is generally a liquid or solid capable of being melted at relatively low temperatures. Most commonly, the active hydrogen compound contains hydroxyl groups as the moieties having the active hydroxyl groups and thus are termed polyols, e.g., the polyols of polyesters, polyester amides, or polyethers, or mixtures of two or more such materials. For reasons of commercial availability and cost, the polyols most commonly employed in the preparation of polyurethanes are the polyethers having hydroxyl terminated chains and hydroxyl terminated polyesters.

Polyurethanes have found extensive commercial application because of their excellent physical properties. These thermoplastic polymers are suitable for molding, spraying and coating products where tensile strength, thermostability, and impact resistance are required.

In view of the fact that a majority of the active hydrogen-containing organic compounds are prepared from nonrenewable resources, it would be highly desirable to prepare polyurethanes from active hydrogen-containing compounds which are obtained from renewable resources.

SUMMARY OF THE INVENTION

In one aspect, the present invention is a polyurethane comprising the reaction product of a polyisocyanate and a dianhydrohexitol.

In another aspect, the present invention is an polyurethane comprising the reaction of a polyisocyanate, a dianhydrohexitol, and a polyahl. As used herein, a "polyahl" is a polyfunctional compound wherein at least two of the functional groups are active hydrogen moieties capable of reacting with an isocyanate moiety to form a urethane, or similar moiety.

The polyurethanes of the present invention are usefully employed in the production of a wide variety of polyurethane products including cellular polyurethanes, polyurethane films and coatings as well as cast or molded articles. The polyurethanes of this invention are also usefully employed in preparing foamed materials. As used herein, the term "polyurethane" is to be broadly construed to include the polymeric reaction products of polyisocyanates, dianhydrohexitols and polyahls as hereinbefore defined.

DETAILED DESCRIPTION OF THE INVENTION

The 1:4-3:6 dianhydrohexitols are the 1:4-3:6 dianhydrides of mannitol, sorbitol and iditol as represented by the formula:

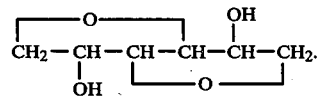

The three dianhydrohexitols are commonly known as isomannide, isosorbide and isoidide after their respective parent hexitols. Of the aforementioned hexitols, isosorbide is most preferred. It is a rigid diol containing two nonequivalent hydroxyl groups (i.e., endo-5 and exo-2). Sorbitol is a particularly preferred starting material because it is produced from sugar waste and cellulose. Each particular dianhydrohexitol is prepared by the acid-catalyzed dehydration and cyclization of the parent hexitol or the intermediate 1:4 or 3:6 monoanhydrohexitol.

The organic diisocyanates which can be employed include aromatic, aliphatic and cycloaliphatic diisocyanates and combinations thereof. Representative of these types of diisocyanates are ethylene diisocyanate, propylene-1,2-diisocyanate, butylene-1,4-diisocyanate, hexylene-1,6-diisocyanate, and other similar aliphatic diisocyanates; 1,3-phenylene diisocyanate, toluene-2,4-diisocyanate and toluene-2,6-diisocyanate and mixtures thereof, diphenyl-3,3'-dimethyl-4,4'-diisocyanate, diphenyl-3,3'-dimethoxy-4,4'-diisocyanate, diphenyl methane-4,4'-dimethyl-3,3'-diisocyanate, naphthylene-1,5-diisocyanate, 1-methoxyphenyl-2,4-diisocyanate, methylene bis(4,4'-phenyl isocyanate), and other similar aromatic diisocyanates; cyclohexylene-1,4-diisocyanate, cyclohexylene-1,2-diisocyanate and other similar cycloaliphatic diisocyanates.

Optional triisocyanates include, for example, 4,4',4''-triphenylmethane triisocyanate, polymethylene polyphenylisocyanate, tolylene-2,4,6-triisocyante, and the like. Tetraisocyanates include 4,4'-dimethyldiphenylmethane-2,2,',5,5'-tetraisocyanate, and the like.

Crude polyisocyanate may also be used in the practice of the present invention, such as crude toluene diisocyanate obtained by the phosgenation of a mixture of toluene diamines or crude diphenylmethylene diisocyanates obtained by the phosgenation of crude diphenylmethylenediamine. The preferred undistilled or crude isocyanates are disclosed in U.S. Pat. No. 3,215,652.

Polyahls may be optionally employed in the preparation of the polyurethanes of this invention. For example, an organic compound having at least two active hydrogen moieites may be copolymerized with the dianhydrohexitol and polyisocyanate.

The polyahl suitably employed in the practice of this invention includes any organic compound having at least two active hydrogen moieties wherein the compound has a number average molecular weight ($M_n$) of at least about 60. Preferably, the polyahl is a polymer having an $M_n$ of at least 200 and at least three repeating units of a monomeric moiety. For the purposes of this invention, an active hydrogen moiety refers to a moiety containing a hydrogen atom which, because of its position in the molecule, displays significant activtiy according to the Zerewitinoff test described by Woller in the Journal of American Chemical Society, Vol. 49, page 3181 (1927). Illustrative of such active hydrogen moieties are —COOH, —OH, —NH$_2$, —NH—, —CONH$_2$, —SH and —CONH—. Typical polyahls include polyols, polyamines, polyamides, polymercaptans and polyacids. Of the foregoing polyahls, the polyols are preferred. Exemplary polyahls which are suitably employed in the practice of this invention are disclosed in U.S. patent application Ser. No. 097,070, filed Nov. 23, 1979, which is incorporated herein by reference.

The solvent which is used in preparing the polyurethanes of the present invention are those polar solvents in which the polyisocyanate, the dianhydrohexitol and other compounds such as catalysts and polyahls are soluble at a temperature in the range of about 0° C. to about 150° C. In addition, the solvent must be a material which will be substantially inert to the reactants and reaction products. The organic solvents are most preferred and representative examples include esters, ethers, ketones, amides, etc. Specific examples of preferred solvents include dimethylsulfoxide, dimethylformamide, N,N-dimethylacetamide, and similar polar solvents.

A catalyst may be optionally employed in the preparation of the polyurethane. The most preferred catalysts are those metallo-organic catalysts which include, for example, stannous acetate, stannous butyrate, stannous laurate, stannous octoate, cobalt naphthenate, zinc naphthenate, cadmium naphthenate, dibutyltin dilaurate, dibutyltin-di-2-ethylhexoate, and the like.

Other suitable urethane catalysts which may be used include tertiary amines such as, for example, triethylenediamine, N-methyl morpholine, N-ethyl morpholine, diethyl ethanolamine, 1-methyl-4-dimethylaminoethyl piperazine, 3-methoxy-N-dimethylpropyl amine, N,N-dimethyl-N',N'-methyl isopropyl propylenediamine, N,N-dimethyl-3-diethylaminopropyl amine, dimethyl benzyl amine and the like.

The quantity of catalyst which is optionally employed is generally dependent upon its activity and/or temperature of the reaction mass. Obviously, more reactive catalysts or higher reaction mass temperatures require smaller amounts of catalyst. In general, quantities between about 0.005 and about 2.0 weight percent of catalyst, based on the combined weight of the isocyanate, dianhydrohexitol and polyahl can be used.

The polyisocyanate, dianhydrohexitol and, optionally, the catalyst and polyahl are added to the solvent which is most preferably at about room temperature. These reactants may be added to the solvent in any order, preferably drop-wise. Most advantageously, any water present in the solvent or reactants is removed prior to the combining of the reactants. Some of the reactants such as the catalyst may be in solid form when added and, hence, it will be necessary to stir the mixture so as to obtain a homogeneous solution. In addition, such agitation will generally increase the rate of reaction.

The compositions of this invention can be prepared in accordance with any method of preparation of polyurethanes is as known in the art. The method of preparation is not restricted to the use of any particular reaction temperature or pressure. Most preferably, the polyurethanes of this invention are prepared under nitrogen at ambient pressure to prevent oxidation of the reactants and to prevent exposure of the reaction mass to atmospheric moisture. There is no requirement that the solvent and/or reactants be heated to above normal room temperature. However, it is desirable to increase the rate of reaction by heating the reaction mass above room temperature to about 130° C. Reaction temperatures below room temperature (i.e., as low as about 0° C.) are desirably avoided due to the slow rate of reaction under such conditions. The reaction time normally is from between about ½ to about 30 hours, most preferably from between about 6 and about 30 hours, depending upon factors such as catalyst, rate of addition of reactants, temperature, etc. Yields of product are normally very high; most often in the range from about 90 percent to about 100 percent.

After reaction is complete, the reaction mass is cooled to near room temperature to yield a fairly viscous product. The product is then precipitated into a solvent such as methanol, ethanol, water and the like. It is most desirable that said solvent be one in which the product will precipitate since recovery of the product can then be easily achieved by any convenient filtration technique. The product prepared by precipitation in such a way normally requires no other treatment as it is generally quite pure and free of entrapped foreign matter. Alternatively, the solvent may be removed from the reaction mass by evaporation.

The preferred polyurethanes are high molecular weight linear polymers comprising dianhydrohexitols and diisocyanates. For example, the dianhydrohexitol can be polymerized in about a 1:1 molar ratio with a diisocyanate. It is also desirable to vary the diisocyanate/dianhydrohexitol molar ratio from about 0.95:1 to about 1.05:1 in order to obtain polyurethanes which are readily soluble in the aforementioned solvents and which contain functional hydroxyl or isocyanate groups, respectively. The diisocyante/dianhydrohexitol polyurethane form good films by evaporation of solvents. Furthermore, such polyurethanes can be compression molded to yield colorless transparent products.

Alternatively, polyurethanes can be high molecular weight polymers comprising dianhydrohexitols and polyisocyanates reacted in combination with other polyahl(s) commonly employed in the art. Accordingly, any of the polyahls which are known in the art can be used in the preparation of the polymer of the present invention.

The amount of polyahl employed in the preparation of the polymer may vary. Typically, the amount of polyahl can range from about 0 to about 90 weight percent, and the dianhydrohexitol can range from about 10 to about 100 weight percent, based on the weight of polyahl and dianhydrohexitol. Most preferably, the amount of polyisocyanate is employed in an amount of about a 1:1 molar ratio of isocyanate moiety to active hydrogen of the dianhydrohexitol plus polyahl.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols or mixtures thereof. A preferred group of chain-extending agents includes water and primary and secondary aromatic diamines which react more readily with the isocyanate than does water, such as phenylenediamine bis(3-chloro-4-aminophenyl)methane, 2,4-diamino-3,5-diethyl toluene, trisecondary butanolamine, isopropanolamine, diisopropanolamine, N-(2-hydroxypropyl)ethylenediamine, and N,N'-di(2-hydroxypropyl)-ethylenediamine.

Foams are prepared by incorporating a blowing agent into the reactant mixture formulations. Suitable blowing agents are described in U.S. Pat. Nos. 4,125,487 and 3,753,933, which are incorporated herein be reference. Examples of suitable blowing agents include the low boiling halogenated hydrocarbons such as methylene chloride and trichloromonofluoromethane. Inert gases can also be injected into the monomeric components during polymerization to form foams. Such gases include nitrogen, helium, xenon, and the like. Cell control agents can also be employed, particularly when preparing foams or products of reduced density and/or to assist in paintability of the product. Suitable cell control agents include silicone oils.

The reactant mixtures of the present invention also react to form a hard product. The reactant mixtures can be shaped or formed into useful articles by injecting the reactive mixture into molds which are capable of withstanding the exotherm of the polymerizating mass. Suitable molds are nonreactive with reactant mixtures. Suitable molds can be made of aluminum, copper, brass, steel; and the like, as well as polyethylene, polypropylene, polyethylene terephthalate, silicone elastomers, and the like. It is understood that the molds can be preferably treated with a suitable mold release agent or an internal mold release agent can be employed in the composition.

Particularly suitable methods for processing the polyurethanes of this invention are accomplished by using a conventional reaction injection molding (RIM) apparatus. Representative injection methods for the RIM processes are disclosed in Reaction Injection Molding, Ed. Walter E. Becker, Van Nostrand Reinhold Co., 1979; Introduction to Reaction Injection Molding, Melvin Sweeney, Technomic Publishing Co., Inc., 1979, which are incorporated herein by reference.

When injecting a relatively rapid-setting blend into massive metal molds, it may be necessary for rapid demolding to preheat the molds to an appropriate temperature so that the mold will not abstract the heat of polymerization from the reactive mass and inappropriately delay the solidification time expected of a given formulation. On the other hand, thin wall metal molds could exhibit a minimal "heat sink" effect on relatively large cross-section castings and, thus, these thin wall metal molds may not require preheating.

Although not critical, molding is accomplished at temperatures ranging from about 0° C. to about 100° C., preferably from about 70° C. to about 90° C. It is desirable to post-cure the product at about 120° C. to about 165° C. for about 30 to about 70 minutes.

The physical and chemical properties of the polyurethanes of this invention depend upon the nature of the polyisocyanate and the nature and amount of the polyahl which is polymerized with the dianhydrohexitol. The dianhydrohexitol is believed to introduce improved thermostability to the polyurethane. In addition, the ringed structure (i.e., the tetrahydrofuran rings) of the dianhydrohexitol is believed to provide good hydrolytic stability to the polyurethane. The good stability is also believed to be provided due to the fact that the etheric bonds of the two rings of the dianhydrohexitol result in the formation of two hydroxyl groups upon hydrolysis without breaking the macromolecular chain.

The products have improved properties, particularly fire resistance, hardness, low solvent sorption, improved transparency and crack resistance. The products find use as neat resins and in reinforced plastics. Of particular note are their use in fiberglass reinforced filament wound pipe, electrical laminates, electrical insulating varnishes and coatings, bulk and sheet molding compounds, corrosion resistant vessels and linings for vessels, films, foams and automotive applications.

The following examples are given to further illustrate the present invention and are not to be construed as limiting the scope thereof in any manner. All parts and percentages are by weight unless otherwise indicated.

EXAMPLE 1

A 250-ml, four-necked flask is equipped with a reflux condenser, mechanical stirrer and nitrogen inlet tube. A purified (by vacuum distillation) 16.82 g (0.1 mole) sample of 1,6-hexamethylene diisocyanate is added dropwise at room temperature from a dropping funnel into said flask containing a rapidly stirred solution of 14.62 g (0.1 mole) of isosorbide in 100 ml of N,N-dimethylacetamide. After addition is completed, 0.2 ml of dibutyltin dilaurate is added and the polymerization is carried out at 75° C. for 24 hours. The viscous, transparent solution is cooled to room temperature, diluted with 500 ml of N,N-dimethylacetamide, precipitated by the drop-wise addition into 5 liters of methanol, left overnight, filtered, washed with methanol, and dried in vacuum at 25° C. A white powder is obtained at 100 percent yield.

The polyurethane is a flexible polymer and is thermoplastic with a glass transition temperature ($T_g$) of 110° C., and a melting temperature ($T_m$) of 190° C., as determined from DSC measurement on a DuPont 1091 Thermal Analyzer. The thermodegradation starts at about 260° C. The polyurethane forms good films by evaporation of the solutions in which it is suspended and colorless transparent compression molded articles.

The limiting oxygen index of 24 as calculated by ASTM D-2863 is higher than that of a comparably prepared well-known polyurethane from 1,6-hexamethylene diisocyanate and 1,4-cyclohexanedimethanol which exhibits a limited oxygen index of 20. This indicates that the polyurethane of this invention can be used in applications when decreased flammability is required. In addition, the polyurethane prepared from 1,6-hexamethylene diisocyanate and 1,4-cyclohexanedimethanol exhibits less thermostability than the polyurethane of this invention, suffering degradation at about 230° C.

EXAMPLE 2

A 250-ml four-necked flask is equipped with a reflux condenser, mechanical stirrer and nitrogen inlet tube. A 2.50 g (0.01 mole) methylenediphenylene diisocyanate sample is added to said flask which contained a rapidly stirred solution consisting of 1.46 g (0.01 mole) isosorbide in 80 ml of N,N'-dimethyloctamide solvent. The mixture is stirred rapidly at room temperature, without a catalyst for 24 hours. The temperature is then increased to 110° C. for 1.5 hours. The viscous, transparent solution is cooled to room temperature and precipitated drop-wise into 1.5 l of methanol. The suspension is left overnight, filtered and washed with methanol and dried in vacuum at 25° C. The resulting product is a white powder and is obtained at about a 100 percent yield.

EXAMPLE 3

In a manner described in Example 2, a polyurethane is prepared by reacting 0.01 mole of isosorbide with 0.01 mole of toluene diisocyanate.

EXAMPLE 4

A foam is prepared as follows. A polymeric diphenylmethane diisocyanate (153.6 g) is mixed with 80 g of a polyol having an equivalent weight of 102, 20 g of isosorbide, 1.0 g of an amine catalyst, 0.2 g of a tin-containing catalyst, 2 g of a silicone surfactant and 51.4 g of freon. The mixture is mixed well with a blender, poured into a large cardboard cup and allowed to harden for 24 hours. The foam so prepared shows increased compressive strength and abrasion resistance over that of a polyurethane comprising the diisocyanate and the polyol.

What is claimed is:

1. A polyurethane comprising the reaction product of a polyisocyanate and a dianhydrohexitol.
2. A polyurethane comprising the reaction product of a polyisocyanate, a dianhydrohexitol and a polyahl.
3. A polyurethane of claim 1 wherein said polyisocyanate is a diisocyanate.
4. A polyurethane of claim 1 wherein said polyisocyanate is selected from a member of the group consisting of methylenediphenylene diisocyanate, 1,6-hexamethylene diisocyanate and toluene diisocyanate.
5. A polyurethane of claim 1 wherein said dianhydrohexitol is selected from a member of the group consisting of isosorbide, isomannide and isoidide.
6. A polyurethane of claim 1 wherein said dianhydrohexitol is isosorbide.
7. A polyurethane of claim 2 wherein said polyahl is a polyol.
8. A polyurethane of claim 1 in the form of a film or molded article.
9. A polyurethane of claim 2 in the form of a film or molded article.
10. A polyurethane of claim 1 in the form of a foam.
11. A polyurethane of claim 2 in the form of a foam.

* * * * *

Notice of Adverse Decision in Interference

In Interference No. 102,321, involving Patent No. 4,443,563, S. K. Dirlikov, C. J. Schneider, POLYURETHANES BASED ON 1:4-3:6 DIANHYDROHEXITOLS, final judgement adverse to the patentees was rendered Dec. 4, 1990, as to claims 1-11.

*(Official Gazette March 5, 1991)*